United States Patent [19]

Lawler

[11] 4,361,977
[45] Dec. 7, 1982

[54] ATTACHMENT APPARATUS

[76] Inventor: Michael J. Lawler, 72 Larabee Crescent, Don Mills, Ontario, Canada, M3A 3E7

[21] Appl. No.: 173,025

[22] Filed: Jul. 28, 1980

[51] Int. Cl.³ .................. A01K 91/04; A01K 93/00; A01K 95/00
[52] U.S. Cl. .................. 43/44.83; 43/44.91; 43/44.92; 43/44.95; 43/43.1; 24/131 C; 24/131 R
[58] Field of Search ............. 43/43.1, 44.83, 44.91, 43/44.94, 44.92, 44.95; 24/131 C, 131 R; 139/85, 89

[56] References Cited

U.S. PATENT DOCUMENTS

| | | | |
|---|---|---|---|
| 2,501,634 | 3/1950 | Rector | 43/44.91 |
| 2,908,992 | 10/1959 | Isbell | 43/44.95 |
| 2,984,882 | 5/1961 | Winn | 24/131 C |
| 3,161,982 | 12/1964 | Lee | 43/43.1 |
| 3,269,047 | 8/1966 | Slattery | 43/44.91 |
| 3,885,598 | 5/1975 | Vogelbacher | 139/89 |
| 4,094,045 | 6/1978 | Stevenson | 43/44.83 |
| 4,117,619 | 10/1978 | Stevenson | 43/43.1 |
| 4,279,092 | 7/1981 | Hutson | 43/44.91 |

FOREIGN PATENT DOCUMENTS 1573866  8/1980  United Kingdom ............... 43/43.1

Primary Examiner—Donald R. Schran
Attorney, Agent, or Firm—Michael M. Sakovich

[57] ABSTRACT

A helical member comprises a continuum of coaxial helixes disposed in spaced longitudinal relation which define an axial aperture that is adapted to receive an external connecting device such as a line or anchor pin. An elastic core is disposed within the aperture in frictional engagement with at least one of the helixes. One end of the core is attached to the member and a free end extends out of the aperture. Gripping the free end and stretching the core reduces its cross-sectional dimensions which releases the frictional engagement and provides sufficient space to admit the connecting device. Releasing tension on the core substantially restores its original dimensions and releasably grips the connecting device between the core and at least one helix to provide a simple, yet effective attachment.

31 Claims, 15 Drawing Figures

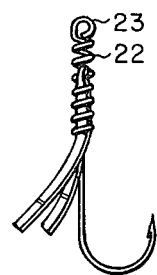
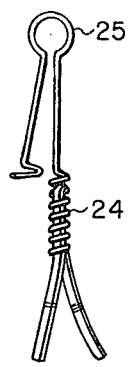
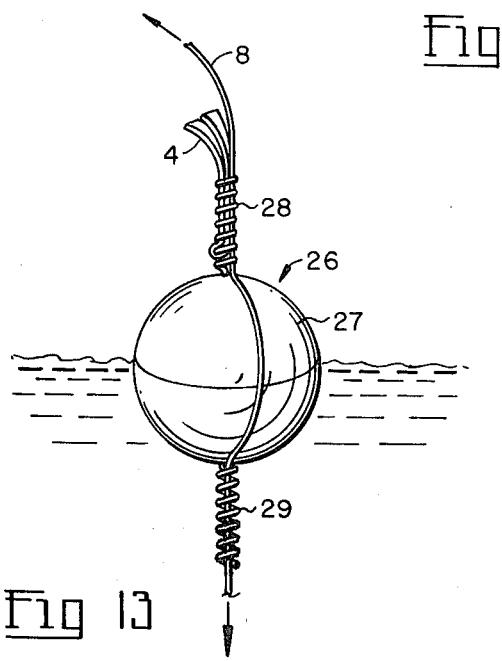
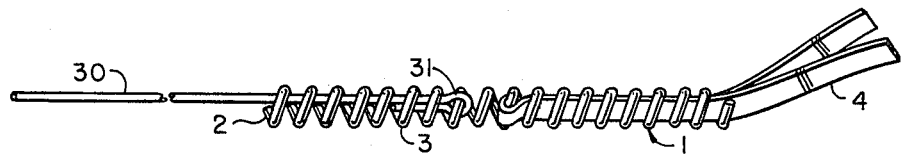

ATTACHMENT APPARATUS

BACKGROUND OF THE INVENTION

This invention relates to a general purpose type of releasable attachment apparatus having a multiplicity of line attachment applications.

Attachments to synthetic and natural fiber monofilamentary, braided or twisted lines, leaders, ropes, cables and metallic wires, hereinafter collectively referred to as lines, exhibit both common and specific problems related to a particular form of attachment. A difficulty commonly experienced, for example, is that the introduction of a knot will considerably reduce the strength of the line. Moreover, knots tend to tighten with use and become increasingly difficult to remove in those applications where detachments are periodically required. And, of course, increasing line diameters result in difficult knot formation and may even require the use of special clamps and tools when forming an attachment.

Specific problems include knot slippage in monofilamentary lines, especially when joined lines are of unequal diameter. As regards metallic wires, detachment generally involves breaking the line. Consequently, releasable attachments made at random along the length of the wire line are usually unsatisfactory because of the weakened condition in which the line is placed and the difficulty in removing an attachment when required.

A multitude of releasable connectors are known in the prior art, especially as it pertains to fishing apparatus. Some of these attachment devices include fishing line sinkers, hook attachment devices, and line release devices, all of which satisfy to some degree the various requirements of attachment apparatus in this art form. However, while entirely adequate for fishing purposes, such attachment apparatus falls considerable short of a general purpose type having useful application in other domestic and industrial applications.

It would appear that the attachment apparatus of the prior art performs reasonably well in achieving its principal object of making secure, releasable connections to a line, whether at an end thereof or intermediate along its length. There is, however, one application in which such apparatus are lacking. This occurs in those applications in which attachment apparatus is required to slip in one direction so that a line may be tightened thereby while holding the line securely from slipping in the opposite direction. This type of attachment apparatus would be useful in any application where slack in a line is taken up periodically as a result of a line stretching condition or where a constant line tension is to be applied as in the case of guying an upstanding structure with tension cables or when lashing down a load as on a flat-bed truck.

SUMMARY OF THE INVENTION

A principal object of the present invention is to provide attachment apparatus of the general purpose type having utility in a multiplicity of attachment applications.

Another provision of the invention is attachment apparatus which will permit a line to slip therethrough in one direction while securely constraining the line in the other direction.

A further provision of the invention is attachment apparatus which is readily adaptable to perform either as a fishing line sinker or float depending upon the material from which the attachment apparatus is fabricated.

Yet another provision of the invention is attachment apparatus which will provide secure, releasable connections at any point along a line without recourse to a free end.

Still another provision of the invention is attachment apparatus which may be formed as an integral part of a fish catching device such as a hook or lure.

Still another provision of the invention is attachment apparatus that will sacrificially release a sinker to prevent line breakage in the event that the sinker is snagged on an obstruction.

Yet another provision of the invention is attachment apparatus that is simple to use and which is economical of manufacture.

The disadvantages of the prior art may be substantially overcome and the foregoing provisions achieved by recourse to my invention which is an attachment apparatus that comprises in combination, a helical member having an axial aperture therethrough adapted to receive external connecting means, the member being defined by a continuum of coaxial helixes disposed in spaced longitudinal relation, and an elastic cord disposed in the aperture in frictional engagement with at least one of the helixes to releasably affix the connecting means thereat, the core having one end secured to the member and a grippable free end extending outwardly therefrom which, when stretched, releases the frictional engagement by reducing the cross-sectional dimensions of the core.

DESCRIPTION OF THE DRAWINGS

The invention will now be more particularly described with reference to embodiments thereof shown, by way of example, in the appended drawings in which:

FIG. 10 is a side elevation view of yet another embodiment of the present invention shown combined with a swivel fastener;

FIG. 11 is a side elevation view of another embodiment of the present invention shown combined with a fish hook;

FIG. 12 is a side elevation view of another embodiment of the present invention shown as a fishing line release device;

FIG. 13 is a side elevation view of another embodiment of the present invention shown combined with a fishing bobber; and FIG. 14 is a side elevation view of still another embodiment of the invention.

DESCRIPTION OF THE ILLUSTRATED EMBODIMENTS

Figure 1:
FIG. 1 is a side elevation view of a helical member according to the present invention.
Figures 2, 3:
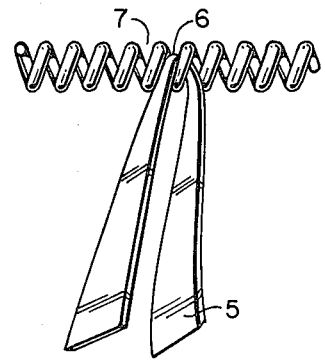
FIG. 2 is a side elevation view of an elastic core that is used in conjunction with the helical member of FIG. 1.
FIG. 3 is a side elevation view of the helical member and elastic core showing the manner in which the core is initially threaded transversely through the member.

An attachment apparatus according to the present invention is shown in FIGS. 1 and 2 as comprising a helical member 1 having an axial aperture 2 that is disposed axially therethrough. It will be noted that the member 1 is defined by a continuum of individual coaxial helixes 3 which are disposed in spaced longitudinal relation.

FIG. 2 illustrates an elastic core which is shown in the form of a rubber strip 4 that is disposed in the aperture 2 in frictional engagement with at least one of the helixes 3 to releasably affix an external connecting means thereat. In this regard, it will be understood that the aperture 2, together with the strip 4, have relative dimensions such that when the strip 4 is stretched, sufficient space is developed between the strip within the aperture and its defining helixes to allow entry within the aperture of such external connecting means which may take the form of either a rigid pin or a compliant line.

Figure 4:
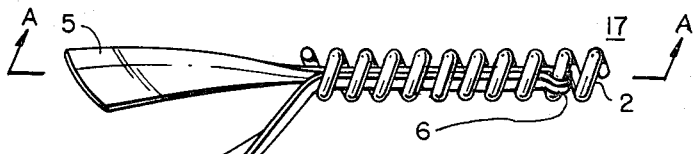
FIG. 4 is a side elevation view of one embodiment of the present invention showing the elastic core disposed in an axial aperture of the helical member.

As may be best seen in FIG. 3, the spacing of adjacent helixes is uniform and is such as to permit the strip 4 to pass transversely therebetween and to have a central portion 6 draped over one of the helixes 3. In this manner, the portion 6 is used as means to secure one end of the folded strip 4 to the member 1. A grippable free end of the strip 4 comprises ends 5 which are positioned outside the aperture 2 by winding both halves of the strip 4 coincidentally with the spaces 7 of the helixes to one end of the member 1. FIG. 4 illustrates the result whereby the strip 4 is caused to be axially disposed in the aperture 2 with the grippable free ends 5 extending outwardly therefrom. This combination of the member 1 and the strip 4 comprises an attachment apparatus 17 that may be used in a multitude of applications.

One specific application in which the foregoing apparatus has considerable utility is that of a fishing line sinker in which case the member 1 would be fabricated from a soft, heavy, non-resilient wire.

Suitable material for sinker wire includes those relatively heavy, soft, ductile metals which resist corrosion such as lead, soft copper, and soft brass. In cross-section, the wire may be right-circular as illustrated in the figures although other cross-sectional configurations may be used with equal effect. Accordingly, the wire may be elliptical in cross-section or even square for example.

Although the foregoing metals in their pure form may be used, it will be understood by those skilled in the art that wire which is overly soft may present difficulties in usage as a result of easy deformation which may cause jamming of the line within the aperture 2. Since the line or other external connecting means is to be releasably secured within the aperture, it is preferred that the helix wire be of sufficient hardness to resist deformation during ordinary handling. To this end, it has been found that doping pure lead with a small quantity of calcium will result in sinker wire that is initially soft in order to readily form a helix configuration but which will age harden in a matter of several days to resist deformation of the individual helixes as well as the uniform spacings thereof.

Figure 5A:
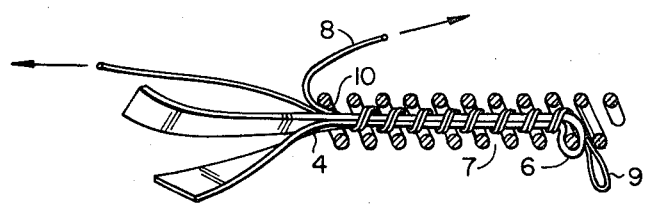
FIG. 5(a) is a longitudinal sectional view of FIG. 4 taken along the lines A—A and showing a first line attached to the member and core.

Referring now to FIG. 5(a) there is illustrated a longitudinal sectional view of the embodiment of FIG. 4 taken along the lines A—A. The purpose of this view is to illustrate the manner in which a sinker fabricated in accordance with the present disclosure may be readily attached to a line 8 without requiring the use of knots or breaking the line in order to form a releasable attachment. According to FIG. 5(a) the line 8 is formed with a loop portion 9 lying across the strip 4 adjacent the central portion 6. Completion of the attachment is performed simply by winding the loop coincidentally with the spaces 7 to one end 10 of the member 1. The line is then releasably affixed intermediate the strip 4 and the helixes 3 by initially stretching the strip so as to reduce the cross-sectional dimensions thereof. As a result, there is a shift in the distribution of the portion 9 wrapped around the strip 4. Thereafter, the stretched strip 4 is released, in the process of which the line is held in frictional engagement intermediate at least one of the helixes 3 and the strip 4.

Release of the line 8 occurs by unwinding the line or stretching the strip 4 by way of the grippable free ends 5 so as to release the frictional engagement while concurrently pulling on the line 8 to draw out that portion of the line wrapped around the strip 4.

In the foregoing embodiment, the line 8 is releasably affixed but may be withdrawn from the member 1 simply by applying sufficient tension to the free ends of the line 8. This is a desirable feature to have in the case of a sinker which at times may become snagged on underwater obstructions. Thus, rather than risk breaking the line with the resultant loss of an expensive lure or other fishing tackle, the sinker when attached to the line 8 in accordance with the method illustrated in FIG. 5(a) will merely result in a sacrificial loss of the sinker by applying a heavy force to the line 8 sufficient to detach the sinker while insufficient to break the line.

Figure 5B:
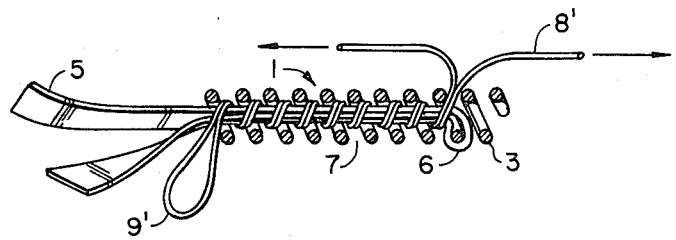
FIG. 5(b) is a longitudinal sectional view of FIG. 4 taken along the lines A—A and showing a different line attached to the member and core.

The full scope and utility of the present attachment apparatus will be appreciated having regard to FIG. 5(b) which is another longitudinal sectional view of FIG. 4 taken along the lines A—A. Structurally, the helical member 1 and its strip 4 are the same as in FIG. 5(a). However, a slip-free attachment to a line 8' is made by slightly varying the manner in which the line 8' is attached. Looking closely at FIG. 5(b), it will be observed that a loop portion 9' overlies the strip 4 at the end 10 and therefrom is wound coincidentally with the spaces 7 up to the central portion 6. As previously described, releasable engagement of the line 8' with the member 1 is obtained by stretching the strip 4 in order to reduce its cross-sectional dimensions and thereafter releasing the strip to substantially restore the aforementioned dimensions, thus releasably affixing the line 8 intermediate at least one of the helixes 3 and the strip 4. In this particular arrangement, however, additional tensile forces applied to the line 8' will not pull the line free from the member 1. Instead, as an increasing tensile force is applied, the strip 4 is drawn towards its central portion 6, tending to an increase in the cross-sectional dimensions of the strip and resulting in a firmer frictional engagement of the line 8' between the strip 4 and helixes 3.

Figure 6:
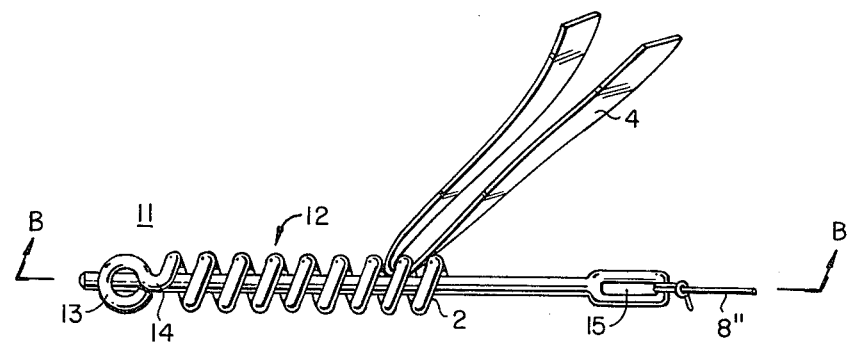
FIG. 6 is a side elevation view of a second embodiment of the present invention.

Another embodiment 11 of an attachment apparatus according to the present invention is illustrated in FIG. 6 which shows a helical member 12 having connector means in the form of an eyelet 13 that is conventionally attachable at an outermost helix 14. Apart from the addition of the eyelet, the embodiment 11 is the same as the previously described embodiment in which the rubber strip 4 is employed as an elastic core. However, whereas the line 8 in the previous embodiment was shown directly interacting with the attachment apparatus 17, in embodiment 11 the line 8" is secured to an eyelet 15 of an anchor pin 16 having a rounded face end that is insertable coaxially with the axial aperture 2.

Figure 7:
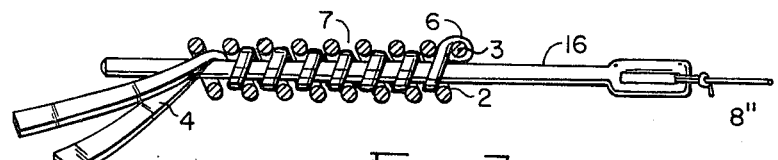
FIG. 7 is a longitudinal sectional view of FIG. 6 taken along the lines B—B and illustrating the manner of securing an anchor pin in the axial aperture of the member.

Securement of the pin 16 within the member 12 is illustrated in FIG. 7 which shows a longitudinal sectional view of the member 12 and the manner in which the strip 4 locks the pin 16 firmly within the aperture 2. As previously described in the first embodiment, the central portion 6 of the strip 4 is secured to a helix 3. See FIG. 5 and the corresponding description. Secure attachment of the pin 16 to the member 12 is thus made by inserting the pin 16 and then tightly wrapping the strip 4 coincidentally with the spaces 7 up to and under the eyelet 13. It will be found that the pin 16 is thus firmly secured within the aperture 2 and may not be withdrawn until the tension on the strip 4 is released by unwinding the strip from the pin 16.

Figure 8:
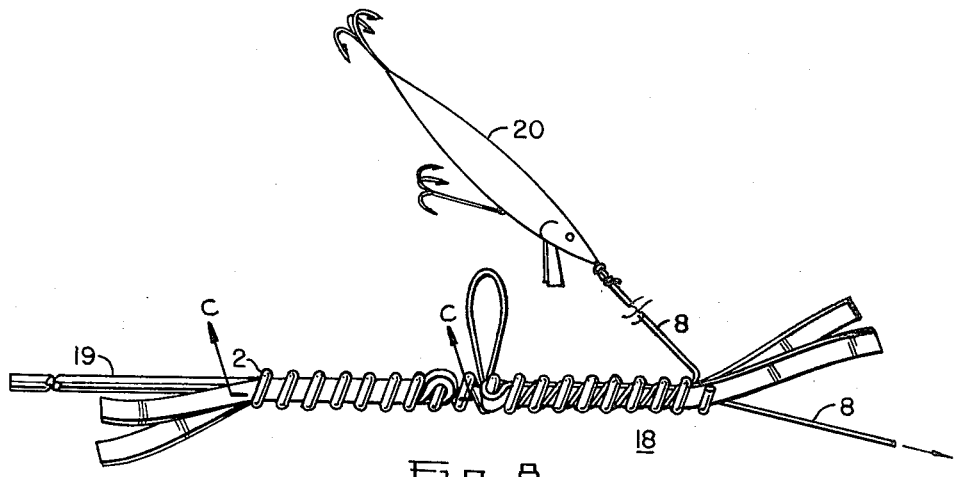
FIG. 8 is a side elevation view of another embodiment of the present invention and its application as a fishing line sinker.
Figure 9:
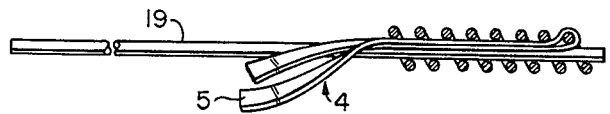
FIG. 9 is a longitudinal sectional view of FIG. 8 taken along the lines C—C and showing the manner in which a narrow rod is releasably inserted into the aperture of the member.

FIG. 8 is illustrative of another embodiment 18 of the subject attachment apparatus shown in the form of a sinker that is attached to the line 8 in the same manner as described in FIG. 5(a). This embodiment, however, is distinguishable from that of FIG. 5(a) by the presence of an elongated narrow flexible rod 19. Attachment of the rod 19 within the axial aperture 2 will be understood by reference to FIG. 9 which is a longitudinal sectional view taken along the lines C—C of FIG. 8. The rod 19 is readily inserted into the aperture 2 by stretching the strip 4 in the same manner as previously described. A reduction of the cross-sectional dimensions of the strip will permit entry of the rod which may then be releasably affixed within the aperture by releasing the strip 4, allowing restoration of its cross-sectional dimensions to the extent possible within the confines of the aperture 2 and the rod therewithin. Securement of the rod 19 in this manner provides sacrificial loss of the rod should it become wedged in amongst rocks or other obstructions. In this arrangement, the purpose of the rod 19 is to allow the embodiment 18 to remain above the bottom for as long as tension is applied to the line 8. Thus, the rod 19 acts as a drag and is the more likely portion of the sinker arrangement that can become hung up on underwater obstructions. In the event, however, that the embodiment 18 is similarly snagged, breakage of the line 8 and loss of a lure 20 is prevented by sacrificial attachment of the line 8 to the helical member as described in FIG. 5(a).

Since a number of applications for the attachment apparatus of the present invention are in a marine environment, it may, under circumstances, be beneficial to provide such attachment apparatus that is buoyant, thereby preventing loss if dropped in the water. Furthermore, there may even be applications in which an attachment apparatus of the present kind is required to be buoyant in nature in order to support a structure to which it may be attached. In this type of application it will be apparent to one skilled in the art of such devices to fabricate the helical member 1, or the corresponding member 12 together with its anchor pin 16, from a substantially non-resilient, buoyant material to permit the member and core or the member, core and pin, as the case may be, to float in fresh water.

Other embodiments of the attachment apparatus disclosed and illustrated herein appear in FIGS. 10, 11, 12 and 13. In each instance, a helical member is employed together with an elastic core to permit attachment of a line. In these embodiments, however, the helical member is fabricated from hard wire. Thus, in FIG. 10, the attachment apparatus comprises a wire helical member 21 having one end securely attached to a snap swivel with the other end being free for attachment to a line. In the embodiment of FIG. 11, one end of a helical member 22 takes the form of a fish hook whereas the other end is provided with an eyelet 23 for conventional connection to a line. The helical member 24 in FIG. 12 has one end formed as an eyelet 25 that is openable and which includes locking means to prevent accidental release of the member 24 from apparatus such as a down-rigger. In this embodiment, the member 24 and its elastic core would provide an attachment to a line 8 as described in FIG. 5(a) to permit release of a fishing line from the down-rigger after a fish has struck to a trailing lure.

Referring now to FIG. 13 there will be seen illustrated a bobber 26 which is commonly used as an indicator that a fish has taken a baited hook. A problem frequently experienced with such devices is attachment of a line 8 to the bobber in such a manner that when the line is retrieved the bobber 26 will be forced down along the line with relative ease as the line is rewound by a rod and reel combination (not shown). It will be observed in FIG. 13 that the bobber 26 comprises a buoyant body 27 that is joined to one end of a helical member 28. Coaxially arranged with the member 28 is a second member 29 diametrically opposed on the body 27 and securely attached thereto. The line 8 is held in frictional engagement between the strip 4 and the member 28 in a manner similar to the rod 19 attachment in FIG. 9. Attachment of the line 8 to the members 28 and 29 is readily achieved by winding the line coincidentally with the spaces of each member until the line runs freely therethrough. Afterwards, the strip 4 may be slipped onto the member 28 from the free end thereof to provide sufficient frictional engagement of the member 28 with the line 8 to hold the bobber 26 in a predetermined location on the line. The advantage of this holding arrangement allows the bobber to readily slip along the line when the bobber abuts the first line guide (not shown) of the rod as the line is wound on the reel and generally facilitates playing a hooked fish.

FIG. 14 illustrates another embodiment of the invention which is similar to the embodiment of FIG. 8. However, in place of the rod 19 which is releasably inserted in the aperture 2, a preformed wire 30 having an eyelet 31 at one end thereof is fixedly attached by sliding the eyelet onto the member 1 as shown. Collapsing the helixes 3 about the eyelet 31 will prevent inadvertent detachment.

It will be apparent to those skilled in the art that the preceding descriptions of the various embodiments may be substantially varied to meet specialized requirements without departing from the spirit and scope of the invention disclosed. For example, the member 12 and pin 16 could be fabricated from either a non-resilient, buoyant material as described or a non-resilient, hard material depending upon the application and environmental conditions. Furthermore, although a minimum of eight helixes are shown in the helical members of the embodiments described, the numbers of helixes may vary considerably. The actual number of helixes is less important than the holding power exerted by the combination of the elastic core and helical member which depends on other factors such as the physical properties of the core and aperture 2 diameter. These embodiments are therefore not to be taken as limiting but rather as exemplary structures of the invention which is defined by the claims appended hereto.

What I claim is:

1. Attachment apparatus comprising, in combination:
   a helical member having an axial aperture therethrough adapted to receive external connecting means, said member defined by a continuum of uniformly spaced, adjacent coaxial helixes disposed in longitudinally extended relation; and
   a folded elastic strip disposed within said aperture in frictional engagement with at least one of the helixes to releasably affix said connecting means thereat, said strip having one end secured to the member and a grippable free end extending outwardly therefrom which, when stretched, releases said frictional engagement by reducing the cross-sectional dimensions of said strip, said dimensions being selected to permit said strip to pass transversely between the spaced helixes and to be wound coincidentally with the spaces therebetween to one end of the helical member, whereby said strip is caused to be disposed in said aperture.

2. Apparatus as claimed in claim 1 wherein said strip includes a longitudinal body portion disposed substantially coaxially with said helixes.

3. Apparatus as claimed in claim 2 wherein the helical member further comprises connector means fixedly secured thereto.

4. Apparatus as claimed in claim 3 wherein the connector means comprise an eyelet disposed at a free end of an outermost helix.

5. Apparatus as claimed in claim 4 wherein said connecting means comprises one of, a line and an anchor pin having an end portion with connector means fixedly secured thereto, and an elongated body portion that is releasably insertable into said aperture together with the stretched elastic core.

6. Apparatus as claimed in claim 5 wherein the latter connector means comprise an eyelet formed integrally with the pin end portion.

7. Apparatus as claimed in claim 6 wherein the free end of the pin is rounded to facilitate admission into the aperture substantially along the long axis thereof.

8. Apparatus as claimed in claim 7 wherein said member and pin are fabricated from a substantially non-resilient buoyant material to permit said member and pin to float in fresh water.

9. Apparatus as claimed in claim 7 wherein said member and pin are fabricated from a material that is hard and non-resilient.

10. Apparatus as claimed in claim 8 wherein the buoyant material is luminous.

11. Apparatus as claimed in claim 4 wherein the connector means further comprise an eyelet disposed at a free end of the opposite outermost helix.

12. Apparatus as claimed in claim 11 wherein the latter eyelet is openable and includes locking means to prevent accidental release of the apparatus.

13. Apparatus as claimed in claim 4 wherein the eyelet is openable and includes locking means to prevent accidental release of the apparatus.

14. Apparatus as claimed in claim 2 wherein said member is fabricated from a substantially non-resilient buoyant material to permit said member and core to float in fresh water.

15. Apparatus as claimed in claim 14 wherein the buoyant material is luminous.

16. Apparatus as claimed in claim 2 comprising, in combination, a second helical member spaced apart in coaxial relation with the first helical member and elastic core, and a buoyant body intermediate the members and joined thereto to permit the combination to float in fresh water.

17. Apparatus as claimed in claim 16 further comprising, an elastic core disposed in the aperture of the second helical member in frictional engagement with at least one of the helixes, said core having one end secured to the second member and a grippable free end extending outwardly therefrom which, when stretched, releases said frictional engagement by reducing the cross-sectional dimensions of said core.

18. Apparatus as claimed in claim 2 comprising, in combination, a buoyant body joined to one end of the helical member to permit the combination to float in fresh water.

19. Apparatus as claimed in claim 2 wherein one end of the helical member is fashioned as a fish hook.

20. Apparatus as claimed in claim 2 wherein said strip is fabricated from rubber.

21. Apparatus as claimed in claim 20 wherein the secured end of said strip comprises a central portion draped over one of the helixes.

22. Apparatus as claimed in claim 21 wherein said member is fabricated from a soft, heavy, non-resilient material.

23. Apparatus as claimed in claim 22 wherein said material comprises wire fabricated from relatively heavy, soft, ductile metals which resist corrosion, including lead, soft copper and soft brass.

24. Apparatus as claimed in claim 23 wherein the lead wire is doped with calcium to obtain an age hardening characteristic.

25. Apparatus as claimed in claim 24 wherein said wire has a cross-section that is right-circular.

26. Apparatus as claimed in claim 24 wherein said wire has a cross-section that is elliptical.

27. Apparatus as claimed in claim 24 wherein said wire has a cross-section that is square.

28. Apparatus as claimed in claim 1 wherein the helical member further comprises connector means fixedly secured to one end thereof, the free end of the strip extending from the other end of said apparatus, and an elongated narrow flexible rod releasably inserted into the aperture in substantially coaxial relation with said strip.

29. A method for releasably attaching a line to a helical member comprising a continuum of coaxial helixes disposed in spaced longitudinal relation defining an axial aperture adapted to receive said line, and an elastic core disposed in said aperture in frictional engagement with at least one of the helixes, comprising the steps of:

stretching the core to reduce its cross-sectional dimensions and thereby releasing said frictional engagement;
inserting the line in said aperture intermediate the core and said member; and
releasing the tension on said core to substantially restore its dimensions and to releasably affix the line intermediate the core and at least one helix.

30. A method for releasably attaching a line to a helical member comprising a continuum of coaxial helixes disposed in spaced longitudinal relation defining an axial aperture adapted to receive said line, and an elastic core disposed in said aperture in frictional engagement with at least one of the helixes, comprising the steps of:
folding the line into a loop;
wrapping the loop coincidentally with the spaces of the helixes and around said core;
stretching the core to reduce its cross-sectional dimensions, thereby releasing said frictional engagement and shifting the distribution of the wrapped loop; and
releasing the tension on said core to substantially restore its dimensions and to releasably affix the shifted line intermediate the core and at least one helix.

31. A method for releasably attaching an elongated rod to a helical member comprising a continuum of coaxial helixes disposed in spaced longitudinal relation defining an axial aperture adapted to receive said rod and an elastic core disposable in said aperture in frictional engagement with at least one of the helixes, comprising the steps of:
inserting the rod into the aperture;
stretching the core to reduce its cross-sectional dimensions and wrapping the stretched core coincidentally with the spaces of the helixes and around said rod; and
releasing the tension on said core to substantially restore its dimensions and to releasably affix the wrapped rod intermediate the core and at least one helix.

* * * * *